(No Model.)
D. IRWIN.
PORTABLE STABLE.
No. 247,917. Patented Oct. 4, 1881.
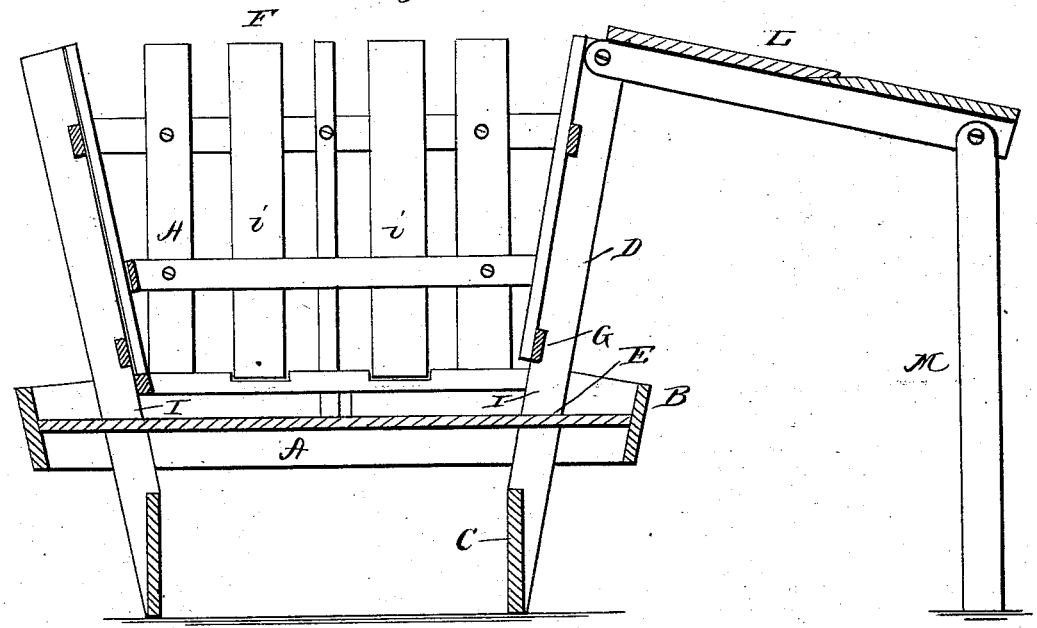
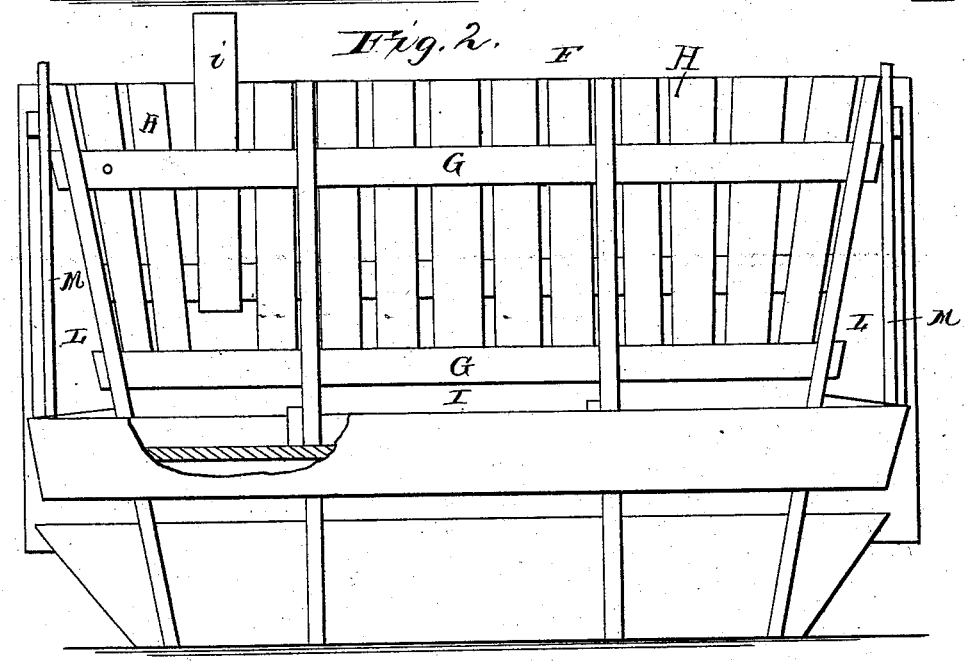
Witnesses:
P. L. Ourand
J. J. McCarthy
Inventor:
David Irwin
By H. J. Ennis
Atty

UNITED STATES PATENT OFFICE.

DAVID IRWIN, OF GRUBBTOWN, MISSOURI.

PORTABLE STABLE.

SPECIFICATION forming part of Letters Patent No. 247,917, dated October 4, 1881.

Application filed April 7, 1880. (No model.)

*To all whom it may concern:*

Be it known that I, DAVID IRWIN, a citizen of the United States, residing at Grubbtown, in the county of Grundy and State of Missouri, have invented certain new and useful Improvements in Portable Stabling for Stock; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an improved portable stable or stock-feeder; and it is particularly designed for use upon large stock-farms.

The invention has for its object to provide an apparatus which can be readily moved from place to place, and which can be so arranged as to shelter the feed, or to form a temporary shelter for the stock while feeding, as more fully hereinafter specified. These objects I accomplish by the device shown in the accompanying drawings, in which—

Figure 1 represents a transverse vertical section of my apparatus, and Fig. 2 a side view of the same.

The letter A indicates a platform, constructed with raised sides B, and mounted on runners C, whereby it may be readily drawn from place to place.

The letter D indicates a series of inclined beams extending through apertures E in the platform, the lower ends of which carry the runners, and the upper ends of which form the main supports for the sides of a bin, F, in which the feed is placed.

The letter G indicates horizontal bars, bolted to the beams D, or otherwise secured to the same, which form supports for the upright slats H, which form the main portion of the sides and ends of the bin.

Between the sides and the bottom of the platform a space, I, is left, which is wider at one side than the other, one side being intended for feeding hay and the other for corn or other similar fodder, the side having the larger space being intended for the hay.

The platform A projects all round the bin a sufficient distance to form a feed-trough, which is divided into compartments by means of partitions. Between each of the beams D is a removable slat, *i*, which may be removed, when desired, to permit the animal to thrust its head into the bin to reach the food.

The letter L indicates a cover hinged to one or both sides of the bin at the top, and provided with hinged beams M at its free edge, as indicated clearly in Fig. 1. The said cover is so arranged that it may be closed over the bin to protect the feed therein, or may be placed in position as shown in Fig. 1, the beams M being either rested at their free ends upon the ground or upon the edge of the bin, so as to hold the cover in position to form a shelter for the stock.

The operation of my invention will be readily understood in connection with the above.

The apparatus may be transported from place to place upon its runners.

The trough at the sides of the apparatus serves to feed the corn or small fodder, while the hay is fed through the openings in the sides of the bin, as before mentioned.

When the apparatus is to be moved from place to place, the beams M and covers L are folded at the sides of the apparatus, as shown in Fig. 2, so as to be out of the way and not interfere with the movement of the apparatus.

Having described my invention, what I claim, and desire to secure by Letters Patent, is—

In a portable stable or stock-feeder, the platform A, having raised sides B, forming a feed-trough, the beams D, extending above and below and through said platform, connected above by means of the bars G, and with the fixed slats H and movable slats *i*, forming a feed-bin, and connected and secured below by a single runner on either side extending the length of the platform or trough, in combination with the shelter L M, substantially as shown, and for the purpose set forth.

In testimony whereof I affix my signature in presence of two witnesses.

DAVID IRWIN.

Witnesses:
 W. P. THOMAS,
 JOHN H. WOOD.